United States Patent
Rabii et al.

(10) Patent No.: US 10,464,675 B1
(45) Date of Patent: Nov. 5, 2019

(54) IN-FLIGHT ENTERTAINMENT SYSTEMS THAT CONSTRAIN BLUETOOTH CONNECTION SETUP THROUGH DOCKING STATIONS

(71) Applicant: Thales Avionics, Inc., Irvine, CA (US)

(72) Inventors: Khosro Rabii, San Diego, CA (US); Jean-Yves Couleaud, Mission Viejo, CA (US); Pierre Schuberth, Corona del Mar, CA (US); Jay Eggenberger, Irvine, CA (US); Pankaj Trivedi, Los Alamitos, CA (US)

(73) Assignee: Thales Avionics, Inc., Irvine, CA (US)

( * ) Notice: Subject to any disclaimer, the term of this patent is extended or adjusted under 35 U.S.C. 154(b) by 213 days.

(21) Appl. No.: 15/608,327

(22) Filed: May 30, 2017

(51) Int. Cl.
*H04N 21/442* (2011.01)
*B64D 11/00* (2006.01)
*H04N 21/41* (2011.01)
*G08C 17/02* (2006.01)
*H04N 21/214* (2011.01)

(52) U.S. Cl.
CPC ........ *B64D 11/00155* (2014.12); *G08C 17/02* (2013.01); *H04N 21/2146* (2013.01); *H04N 21/4126* (2013.01); *H04N 21/44227* (2013.01)

(58) Field of Classification Search
CPC . A63F 13/00; A63F 9/24; G07F 17/32; G07F 17/3227
See application file for complete search history.

(56) References Cited

U.S. PATENT DOCUMENTS

| | | | | |
|---|---|---|---|---|
| 2010/0240455 | A1* | 9/2010 | Gagner | G07F 17/32 463/30 |
| 2012/0047289 | A1* | 2/2012 | Krzystofczyk | H04L 63/083 710/10 |
| 2014/0075169 | A1* | 3/2014 | Andrews | G06F 9/4416 713/2 |
| 2018/0049005 | A1* | 2/2018 | Still | H04W 4/043 |
| 2018/0234706 | A1* | 8/2018 | Boussemart | H04H 20/62 |

* cited by examiner

*Primary Examiner* — Frank F Huang

(57) ABSTRACT

An entertainment system includes a docking station having a wired interface, a display unit, and a wireless controller. The display unit includes a video display device and a processor that communicates through a Bluetooth transceiver and the wired interface of the docking station. The wireless controller includes a processor that communicates through a wired interface and a Bluetooth transceiver. The wireless controller is releasably docked in the docking station to communicatively connect the wired interfaces of the wireless controller and the docking station. While docked in the docking station the processors of the wireless controller and the display unit communicate through the wired interfaces of the wireless controller and the docking station to establish a Bluetooth connection between the Bluetooth transceivers of the wireless controller and the display unit. The processor of the wireless controller does not operate to establish the Bluetooth connection using communications through the Bluetooth transceiver.

20 Claims, 11 Drawing Sheets

IN-FLIGHT ENTERTAINMENT SYSTEMS THAT CONSTRAIN BLUETOOTH CONNECTION SETUP THROUGH DOCKING STATIONS

FIELD OF THE INVENTION

The present disclosure relates to aircraft-based in-flight entertainment systems that communicate with mobile terminals using Bluetooth communication links.

BACKGROUND

In-flight entertainment (IFE) systems have been deployed onboard aircraft to provide entertainment, such as movies, television, audio entertainment programming, electronic games, and other electronic content to passengers. IFE systems are increasingly using wireless access points to provide the electronic content from a content server to passenger equipment carried on-board (e.g., cellular phones, tablet computers, laptop computers), seat video display units (SVDUs), and other communication terminals within the aircraft. Some IFE systems provide wireless controller, also referred to as passenger control units (PCUs), at passenger seats that are wirelessly connected through Bluetooth to the seats' SVDUs, and which can be held by passengers and operated to control content selection and playback through the SVDUs. These wireless communications are typically performed within the industrial, scientific and medical (ISM) radio band.

The proliferation of such wireless equipment operating simultaneously and with unsynchronized use of the ISM radio resources within an aircraft cabin, can result in levels of communication interference that degrade or intermittently prevent operation of the IFE system. For example, hundreds of SVDU wireless transceivers and corresponding wireless controllers' transceivers can be simultaneously interfering with each other's communications. Moreover, communications by these wireless transceivers would likely interfere with and be interfered with by the operation of wireless transceivers within hundreds of passengers' equipment.

The wireless transceivers are typically programmed to respond to degradation of their communication link quality by increasing their transmission power level. However, these operations can result in a rapid escalation of the signal noise floor within the cabin and further degrade or intermittently prevent operation of the IFE system.

SUMMARY

Some embodiments of the present disclosure arise from the present realization that wireless systems in aircraft cabins and many other environments have a high concentration of wireless transceivers competing for the same shared frequency band. The operations to establish and re-establish Bluetooth connections between the wireless transceivers can substantially contribute to the frequency band congestion and degrade or intermittently prevent operation of parts of system. Moreover, some systems require a one-to-one pairing between transceivers, such as between a SVDU and a wireless controller that will be used by a passenger in the facing seat. When these systems require hundreds of such one-to-one pairings, the Bluetooth operations to establish connection pairings and to reestablish lost connection pairings can become difficult or intermittently not possible when hundreds of such transceivers are simultaneously attempting to advertise their presence, request connections, respond to connection requests, and other perform other wireless connection establishment and re-establishment transmissions using the shared congested frequency band.

Some embodiments of the present disclosure are directed to an entertainment system that includes a docking station having a wired interface, a display unit, and a wireless controller. The display unit includes a video display device and a processor that is connected to communicate through a Bluetooth transceiver and through the wired interface of the docking station. The wireless controller includes a processor connected to communicate through a wired interface and a Bluetooth transceiver. The wireless controller is configured to be releasably docked in the docking station to communicatively connect the wired interfaces of the wireless controller and the docking station. While docked in the docking station, the processor of the wireless controller and the processor of the display unit are configured to communicate through the wired interfaces of the wireless controller and the docking station to establish a Bluetooth connection between the Bluetooth transceivers of the wireless controller and the display unit. The processor of the wireless controller does not operate to establish the Bluetooth connection using communications through the Bluetooth transceiver of the wireless controller.

Because the messaging related to establishing or re-establishing a Bluetooth connection is routed through the wired interconnects, it can be immune to congestion in the shared frequency band and can be performed securely without risk of wireless interception by an unauthorized device (e.g., operated by a malicious passenger). Moreover, one-to-one pairing can be performed with certainty as to which wireless controller is being paired to which display unit.

Some other embodiments are directed to a wireless controller that includes a wired interface, a Bluetooth transceiver, and a processor. The processor is connected to communicate through the wired interface and the Bluetooth transceiver. The wireless controller is configured to be releasably docked in a docking station to communicatively connect the wired interface of the wireless controller to a wired interface of the docking station. While docked in the docking station the processor of the wireless controller is configured to communicate through the wired interfaces of the wireless controller and the docking station with a processor of a display unit to establish a Bluetooth connection between the Bluetooth transceiver of the wireless controller and a Bluetooth transceiver of the display unit. The processor of the wireless controller does not operate to establish the Bluetooth connection using communications through the Bluetooth transceiver of the wireless controller.

Some other embodiments are directed to a display unit that includes a wired interface connected to a docking station, a Bluetooth transceiver, and a processor. The processor is connected to communicate through the Bluetooth transceiver and through the wired interface with a wireless controller that is docked in the docking station. While docked in the docking station, the processor of the display unit is configured to communicate through the wired interface to the docking station with a processor of a wireless controller to establish a Bluetooth connection between the Bluetooth transceiver of the display unit and a Bluetooth transceiver of the wireless controller. The processor of the display unit does not operate to establish the Bluetooth connection with the wireless controller using communications through the Bluetooth transceiver of the display unit.

Other systems, wireless controllers, display units, and/or corresponding methods according to embodiments of the inventive subject matter will be or become apparent to one with skill in the art upon review of the following drawings and detailed description. It is intended that all such additional systems, wireless controllers, display units, and/or corresponding methods be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
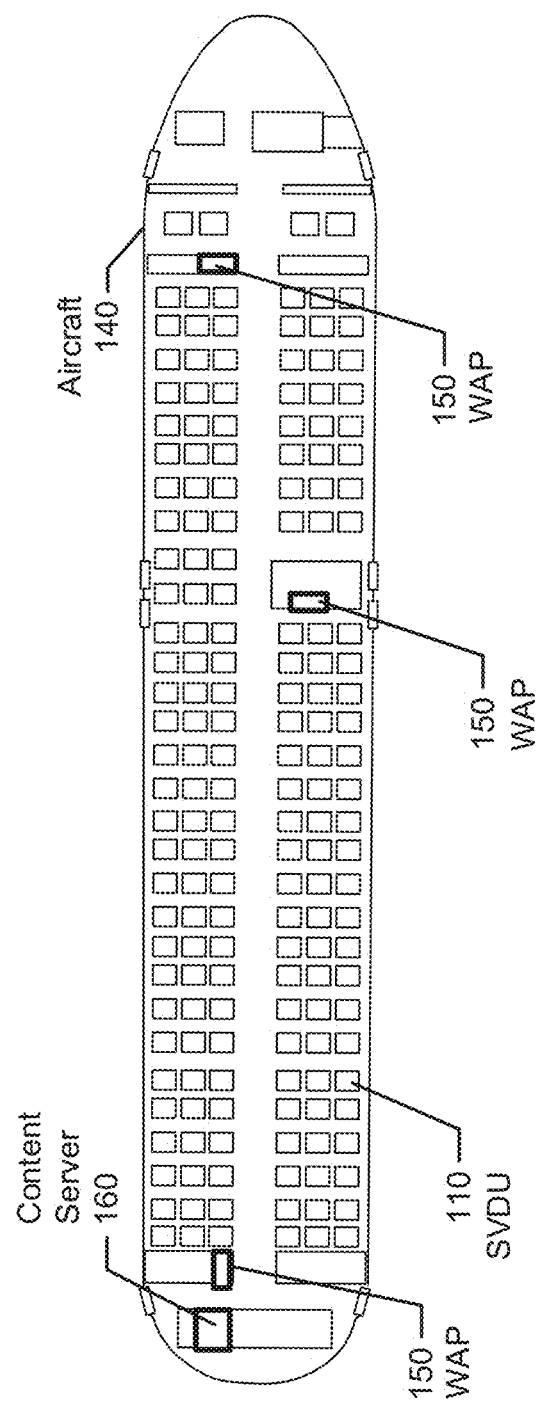
FIG. 1 illustrates an aircraft cabin containing an in-flight entertainment (IFE) system having a content server that streams electronic content through wireless access points (WAPs) to passenger equipment and through a wired network to seat video display units (SVDUs) that are controlled by wireless controllers (also called PDUs), in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, an aircraft cabin can have a very high density of wireless transceivers that are simultaneously attempting to use the same ISM frequency resources for communications. The resulting co-channel interference can degrade or preclude wireless communications within the aircraft cabin and, thereby, degrade or intermittently prevent operation of elements of the IFE system. Moreover, the wireless transceivers would normally respond to increasing levels of interference by further increasing their transmission power levels and which, undesirably, further increases the interference problem.

Various embodiments of the present disclosure arise from the present realization that the operations to establish and re-establish Bluetooth connections between wireless transceivers can substantially increase the congestion that degrades or intermittently prevents operation of the systems. Moreover, some systems require a one-to-one pairing between transceivers, such as between a SVDU and a wireless controller to be used in the facing seat. When these systems have hundreds of such one-to-one pairings, their operations to establish connection pairings and to reestablish lost connection pairings can become difficult or intermittently not possible when hundreds of the corresponding transceivers are simultaneously attempting to advertise their presence, request connections, respond to connection request, and other connection establishment and re-establishment transmissions using the shared frequency band.

Various embodiments of the present disclosure are directed to innovative operations and methods for establishing Bluetooth connections between Bluetooth transceivers of wireless controllers and display units using wired communications while the wireless controllers are docked in docking stations. These operations and methods can effectively reduce wireless communications interference that would otherwise result from performing the connection establishment operations through RF communications, make the connection establishment operations immune to effects of local wireless communications interference, and make the connection establishment operations secure from wireless interception by an unauthorized device (e.g., operated by a malicious passenger). Moreover, one-to-one pairing can be performed with certainty as to which wireless controller is being paired to which display unit.

As will be explained in further detail below, some embodiments are directed to an In-flight entertainment (IFE) system that includes wireless controllers, also referred to as passenger control units (PCUs) and dockable PCUs, having Bluetooth transceivers, and includes display units, also referred to as seat video display units (SVDUs), having Bluetooth transceivers. The Bluetooth transceivers are configured to transmit and receive radio frequency (RF) signals in the ISM band. Although various embodiments herein are primarily described in the context of an IFE system deployed onboard an aircraft, the invention is not limited thereto. Instead, these and other related embodiments may be used to control wireless communication transceivers located in other types of vehicles, including without limitation, trains, automobiles, cruise ships, and buses, and in other non-vehicle installations, including without limitation, meeting rooms, sports stadiums, etc.

Embodiments are also described in the context of the Bluetooth transceivers being configured to transmit and receive using radio resources in the ISM band. As used herein, the term "ISM band" refers to one or more frequency ranges that are reserved internationally for the use of radio frequency energy for unlicensed and/or licensed communications. The term "band" can refer to one continuous frequency range or a plurality of non-continuous frequency ranges that are defined by the ITU Radio Regulations for ISM communications.

FIG. 1 illustrates an aircraft fuselage 140 containing an IFE system that provides entertainment services to passengers. The IFE system can include a content server 160 that streams and/or downloads electronic content through wired networks (e.g., Ethernet) and/or through wireless access points (WAPs) 150 to seat video display units (SVDUs) 110 that may be mounted to structures within the aircraft, including to seatbacks, seat armrests/frames, bulkheads, overhead structures, etc. The content server 160 may additionally stream and/or download electronic content through WAPs 150 to passenger equipment carried on-board by passengers, such as mobile phones, tablet computers, laptop computers, etc. The SVDUs 110 may each contain a Bluetooth transceiver that wirelessly communicates through ISM band RF signaling with Bluetooth transceivers within passenger controllers, also referred to as PDUs, that may be releasable docked to an armrest docket station and/or a docket station connected to or adjacent to some/all of the SVDUs 110. The Bluetooth transceiver within a SVDU 110 is understood to be the communication circuitry (i.e., transceiver, signal processor, etc.) which can be incorporated within the same housing that at least partially encloses a display device, video display circuitry, network interface, and other circuitry providing functionality for the SVDU 110.

Each seat is associated with a docking station having a wired interface. The SVDU 110 facing the seat includes a processor that is connected to communicate through a Bluetooth transceiver and through the wired interface of the docking station. A wireless controller (PCU) includes a processor connected to communicate through a wired interface and a Bluetooth transceiver. The wireless controller is configured to be releasably docked in the docking station to communicatively connect the wired interfaces of the wireless controller and the docking station. While docked in the docking station the processor of the wireless controller and the processor of the display unit are configured to communicate through the wired interfaces of the wireless controller and the docking station to establish a Bluetooth connection between the Bluetooth transceivers of the wireless controller and the display unit. The processor of the wireless controller does not operate to establish the Bluetooth connection using communications through the Bluetooth transceiver of the wireless controller. Accordingly, a Bluetooth connection between a pair of Bluetooth transceivers in a wireless controller and a SVDU 110 is establish through wired communications and subsequent communications while the Bluetooth connection is maintained (e.g., unrelated to establishing the Bluetooth connection) are then performed through the Bluetooth transceivers.

Figure 2:
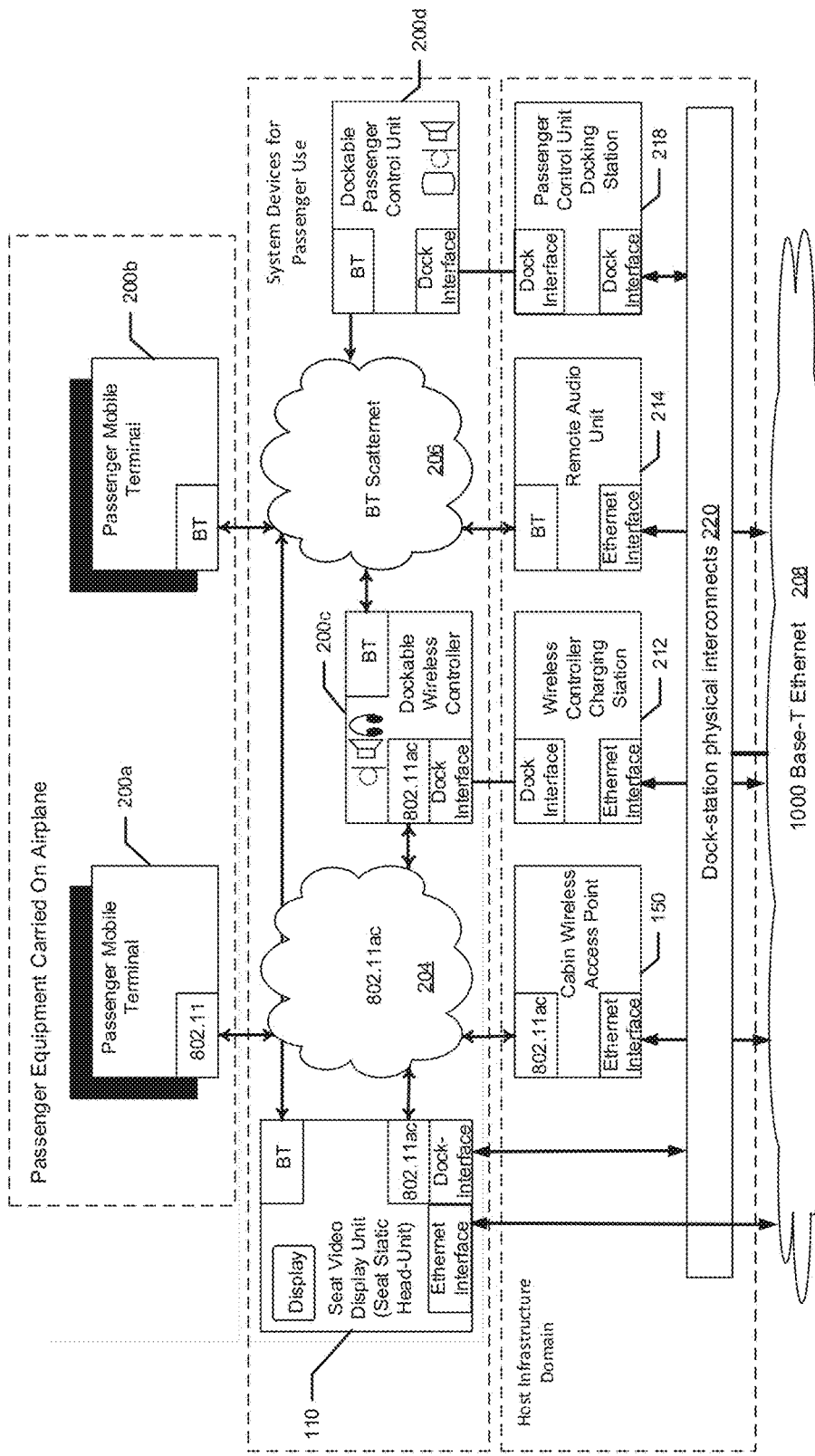
FIG. 2 is a block diagram illustrating the IFE system of FIG. 1 that is configured to operate in accordance with some embodiments of the present disclosure.

FIG. 2 is a block diagram of the IFE system of FIG. 1 which are configured to operate in accordance with some embodiments of the present disclosure. Referring to FIG. 2, the IFE system includes system devices that can be located at each passenger seat location, and which is configured to communicate with various types of passenger equipment that can be carried on-board by passengers. The seat-located system devices can communicate using RF resources within the ISM band with the passenger equipment using an IEEE 802.11ac wireless network 204 and/or a Bluetooth (BT) scatternet wireless network 206. The example passenger equipment includes a passenger mobile terminal 200a having an IEEE 802.11 (WiFi) transceiver and another passenger mobile terminal 200b having a Bluetooth transceiver. Various other types of passenger equipment may include both WiFi and Bluetooth transceivers.

The system devices can include a SVDU 110, a dockable wireless controller 200c, and a dockable passenger control unit 200d. The system may include only one or both of the dockable wireless controller 200c and the dockable passenger control unit 200d, which may be the same or similar type of device or may be different types of devices, and which can be collectively referred to as wireless controllers. The dockable wireless controller 200c and the dockable passenger control unit 200d can be operated by a passenger to wirelessly control the SVDU 110, such as to select content that is consumed (e.g., played through a display), select among menu items, and control other operations of the SVDU 110. The example SVDU 110 includes a display device, video display circuitry, a general-purpose processor, a Bluetooth transceiver, and an Ethernet interface or other wired network interface. The dockable wireless controller 200c includes a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The dockable passenger control unit 200d can similarly include a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The wireless controller 200c, the passenger control unit 200d and dockable passenger control unit 200d, collectively referred to as wireless controller 200, may be configured as handheld devices for operation by passengers and can be stored in docking stations, which may be configured to recharge batteries within the handheld devices. A wireless controller 200 may be a handheld device that is owned by the aircraft operator and provided for temporary use by a passenger during a flight, or may be a passenger equipment carried on-board by passengers, such as mobile phones, tablet computers, laptop computers, etc.

The seat-located system devices are connected to host infrastructure that can include the cabin wireless access points 150 spaced apart within the aircraft cabin and mounted to cabin ceiling structures, storage bin structures, bulkheads, etc. An Ethernet backbone network 208, e.g., 100 Base-T Ethernet, extends throughout the aircraft cabin to communicatively interconnect the seat-located system devices to the content server 160 and the wireless access points 150. The wireless access points 150 can each include an 802.11ac or other WiFi transceiver and an Ethernet interface that connects to the Ethernet backbone network 208.

The host infrastructure can include a passenger control unit docking station 218, a wireless controller charging station 212 (although its functionality may be incorporated into the docking station 218), and a remote audio unit 214. The wireless controller charging station 212 is located at each seat and has a dock interface that releasably stores the dockable wireless controller 200c and charges a battery therein, and has an Ethernet interface that connects to the Ethernet backbone network 208. The passenger control unit docking station 218 is also located at each seat and has a dock interface that releasably stores the dockable passenger control unit 200d and charges a battery therein, and has an Ethernet interface that connects to the Ethernet backbone network 208.

The SVDU 110 facing a seat includes a processor that is connected to communicate through a Bluetooth transceiver and through the wired interface of the docking station 218. A wireless controller (PCU) 200 includes a processor connected to communicate through a wired interface and a Bluetooth transceiver. The wireless controller 200 is configured to be releasably docked in the docking station 218 to communicatively connect the wired interfaces of the wireless controller 200 and the docking station 218. While docked in the docking station 218 the processor of the wireless controller 218 and the processor of the display unit 110 are configured to communicate through the wired interfaces of the wireless controller 200 and the docking station 218, via a dock-station physical interconnects (e.g., wired connections) 220, to establish a Bluetooth connection between the Bluetooth transceivers of the wireless controller 200 and the display unit 110. The processor of the wireless controller 200 does not operate to establish the Bluetooth connection using communications through the Bluetooth transceiver of the wireless controller 200. Accordingly, a Bluetooth connection between a pair of Bluetooth transceivers in a wireless controller 200 and a SVDU 110 is establish through wired communications and subsequent communications while the Bluetooth connection is maintained are then performed through the Bluetooth transceivers.

Each of the Bluetooth transceivers in the wireless controller 200 and the SVDU 110 is configured to measure signals received within the ISM band from other Bluetooth transceivers, and to generate measurement reports containing the measurements. The Bluetooth transceivers can exchange the reports through the Bluetooth connection.

The remote audio unit 214 may also be located at each seat or adjacent to a group of seats, and can contain a wired headphone jack, a Bluetooth transceiver, and an Ethernet interface that connects to the Ethernet backbone network 208, to receive and play audio through a loudspeaker and/or through the Bluetooth transceiver and/or the wired headphone jack to a headset worn by one or more passengers.

Figure 3:
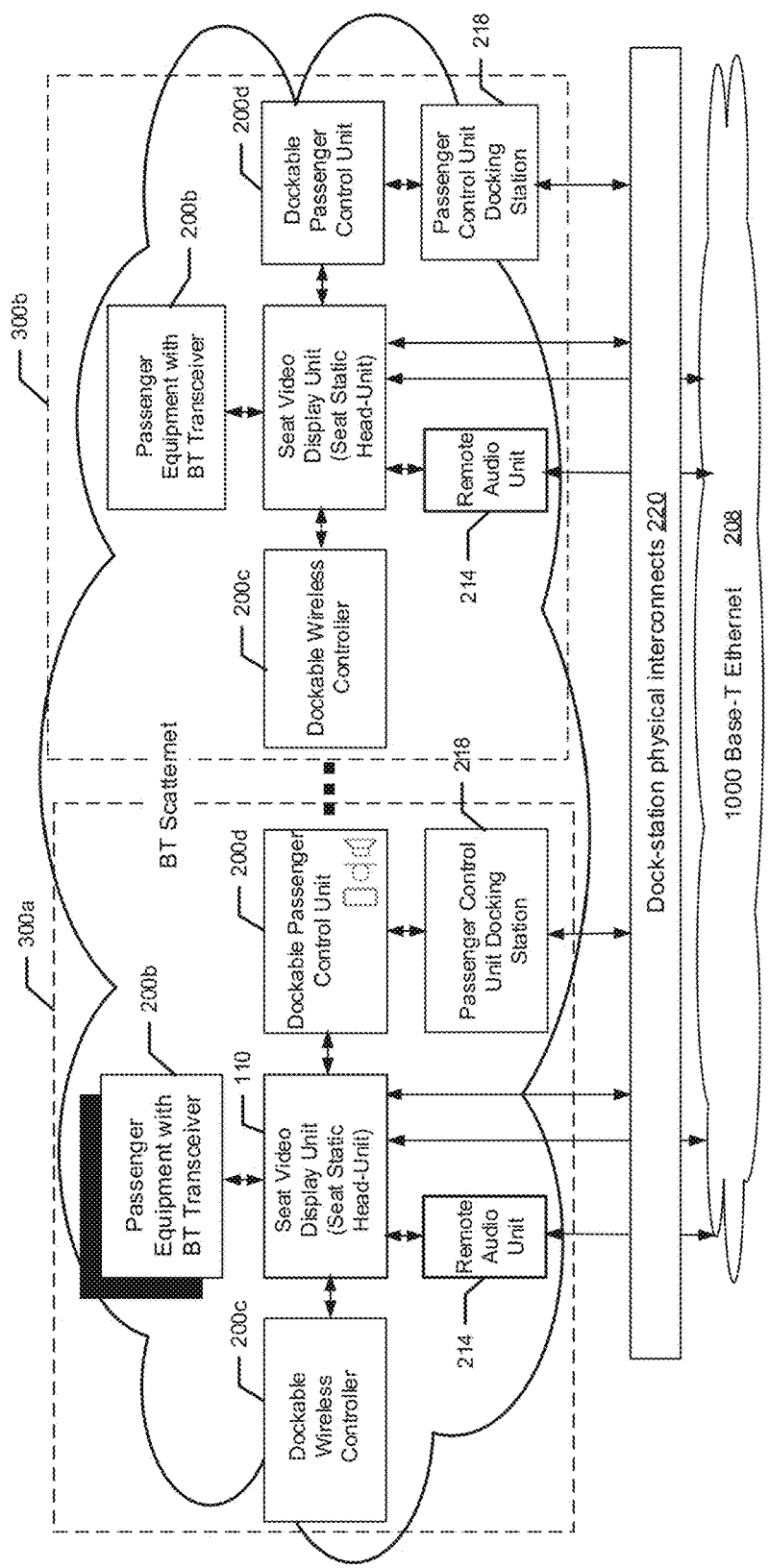
FIG. 3 is another block diagram of the IFE system of FIGS. 1-2 which is configured to operate in accordance with some embodiments of the present disclosure.

FIG. 3 is another block diagram of the IFE system of FIGS. 1-2 which is configured to operate in accordance with some embodiments of the present disclosure. Referring to FIG. 3, an example configuration of components is illustrated for two spaced apart seat locations 300a and 300b. Each seat location 300a/300b is illustrated as being configured to include a passenger equipment with Bluetooth transceiver 200b, a dockable wireless controller 200c, a SVDU 110, a dockable passenger controller unit 200d, a remote audio unit 214, and a passenger control unit docking station 218. These per-seat component configurations can be replicated for any number of seat locations, and one or more of the components that is illustrated as being replicated at each seat location may instead be connected to serve components at more than one seat location.

A dockable wireless controller 200c and a dockable passenger control unit 200d are paired with a particular SVDU 110 while whey they are docked in docking station 218. The dockable wireless controller 200c and a dockable passenger control unit 200d are collectively referred to as wireless controller 200. As explained above, while docked in the docking station 218 the processor of the wireless controller 200 and the processor of the SVDU 110 are configured to communicate through the wired interfaces of the wireless controller 200 via the dock-station physical interconnects (i.e., wired connections) 220 and the docking station 218 to establish a Bluetooth connection between the Bluetooth transceivers of the display unit and the wireless controller 200.

Figure 4:
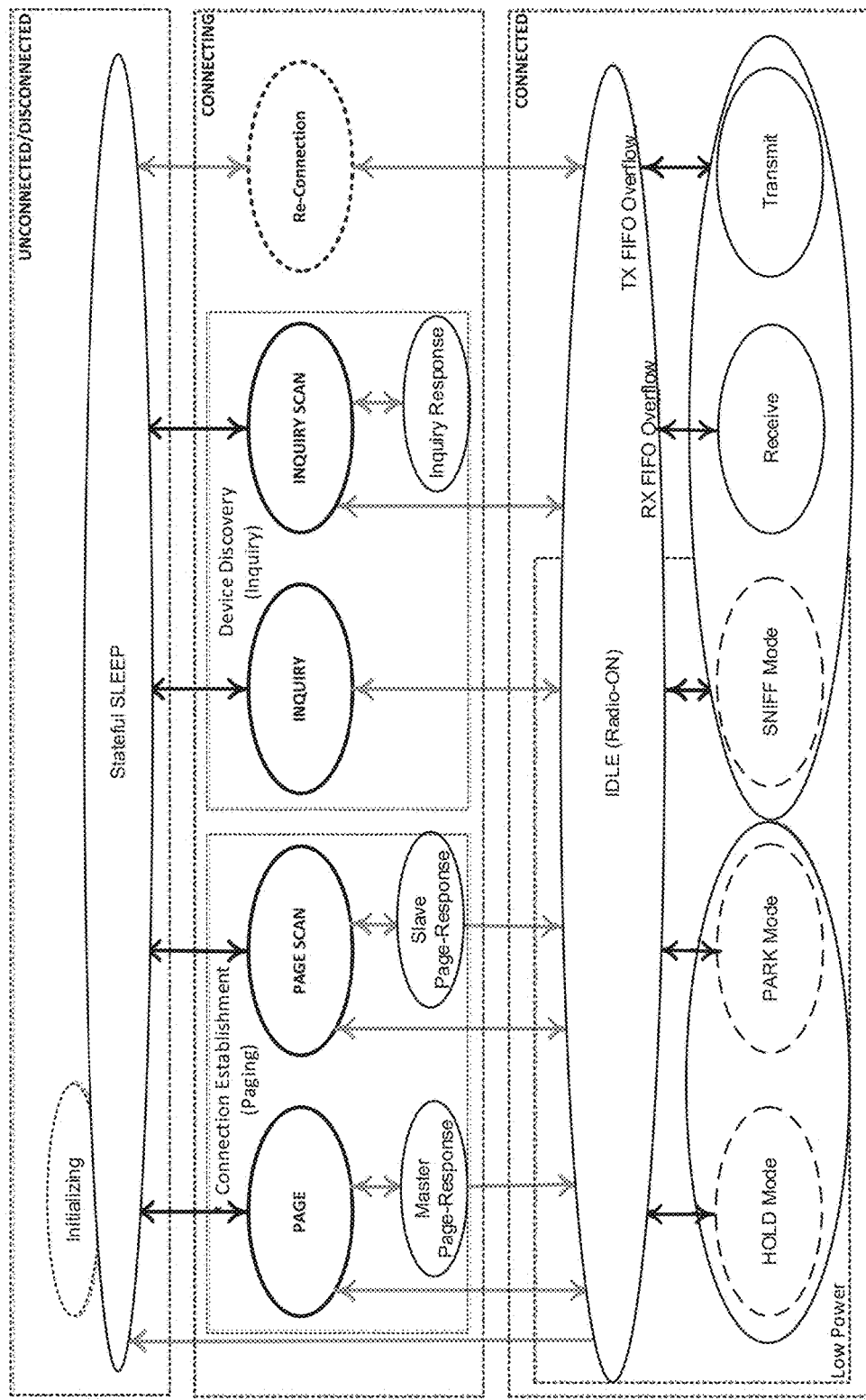
FIG. 4 is a flowchart and data flow diagram for various operational states of Bluetooth transceivers in the wireless controllers and the display units of the system of FIGS. 1-3 in accordance with some embodiments of the present disclosure.

FIG. 4 is a flowchart and data flow diagram for various operational states of Bluetooth transceivers in the wireless controllers 200 and the display units 110 of the system of FIGS. 1-3 in accordance with some embodiments of the present disclosure. Referring to FIG. 4, the type of operations performed by Bluetooth transceiver depends upon the state of the Bluetooth transceivers connection, which include includes: unconnected/disconnected; connecting; and connected. In the unconnected/disconnected state, the Bluetooth transceiver can operate in a statefull sleep operational mode, which is a lower power mode. In the connecting state, the Bluetooth transceiver operates to perform connection establishment (paging), device discovery (inquiry), and/or re-connection responsive to a lost connection. Connection establishment operations can include performing paging and paging scan. Device discovery operations can include performing inquiry and inquiry scan.

In the connected state, the Bluetooth transceiver performs idle operations (radio-on) while waiting for data to be received (via an antenna) into the receive FIFO buffer and waiting for data to be input to the transmit FIFO buffer awaiting transmission through the antenna. The Bluetooth transceiver also performs hold mode operations, Park mode operations, sniff mode operations, operations to receive data through the antenna into the receive FIFO buffer (e.g., for output to the processor of SVDU 110), and operations to transmit data that has been input to the transmit FIFO buffer (e.g. by the processor of the SVDU 110) for transmission through the antenna.

Figure 5:
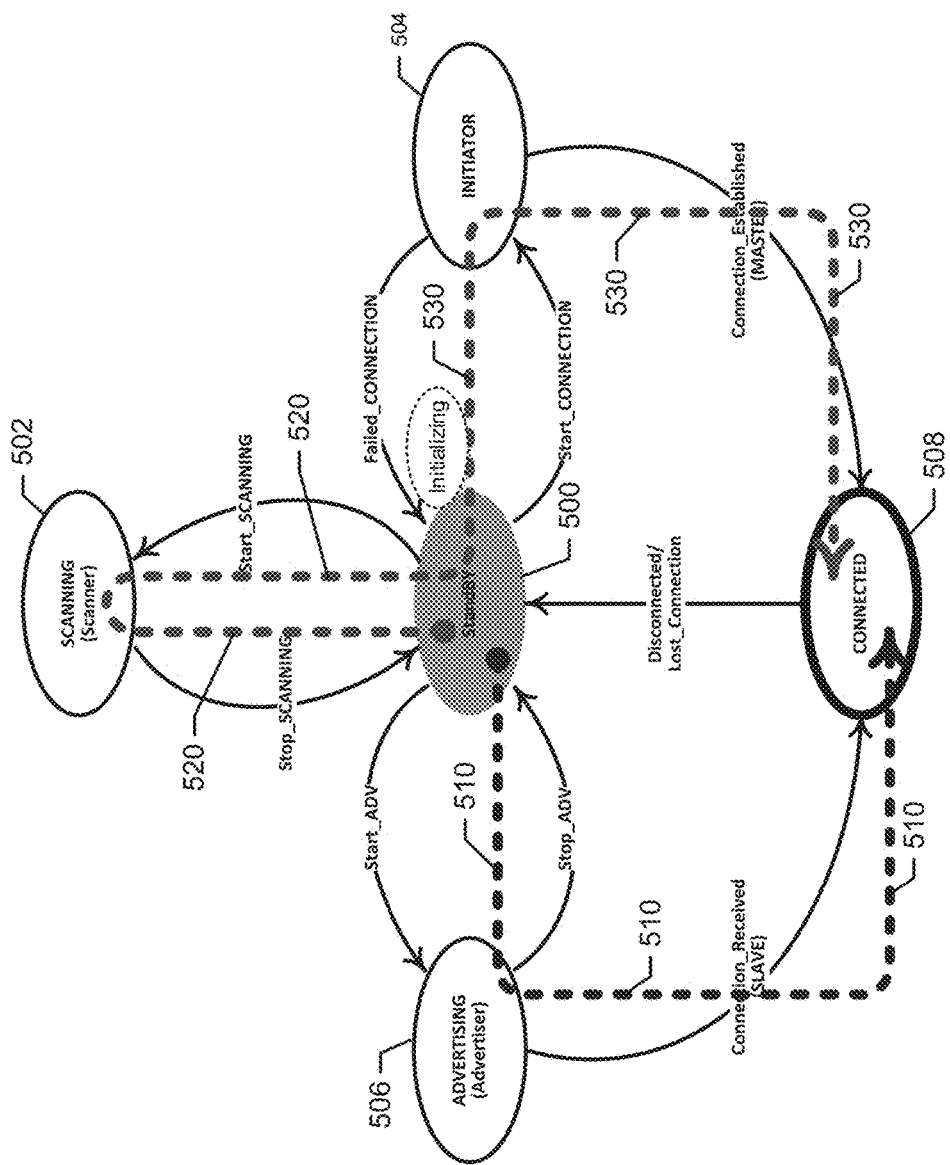
FIG. 5 is a state diagram for various operational states of Bluetooth transceivers in the wireless controllers and the display units of the system of FIGS. 1-4 in accordance with some embodiments of the present disclosure.

FIG. 5 is a state diagram for various operational states of Bluetooth transceivers in the wireless controllers 200 and the display units 110 of the system of FIGS. 1-4 in accordance with some embodiments of the present disclosure. Referring to FIG. 5, a Bluetooth transceiver can perform operations corresponding to the standby state 500, scanning state 502, initiator state 504, advertising state 506, and connected state 508. Depending upon congestion in the shared wireless band, a Bluetooth transceiver can frequently lose its Bluetooth connection to another device. For conventional Bluetooth transceivers that perform re-connection operations through wireless Bluetooth communications, the congested wireless band can result in unreliable communication channels and can interfere with or prevent reconnection of the Bluetooth transceivers, and increase power consumption during the reconnection attempts. In accordance with various embodiments herein, the original connection establishment and subsequent reconnection establishment operations are performed through wired communications while the wireless controllers 200 are docked in the docking stations 218. FIG. 5 illustrates the state transitions 530 of a Bluetooth transceiver operating as a master device and further illustrates the state transitions 510 of another Bluetooth transceiver operating as a slave device, according to various embodiments herein.

Figure 6:
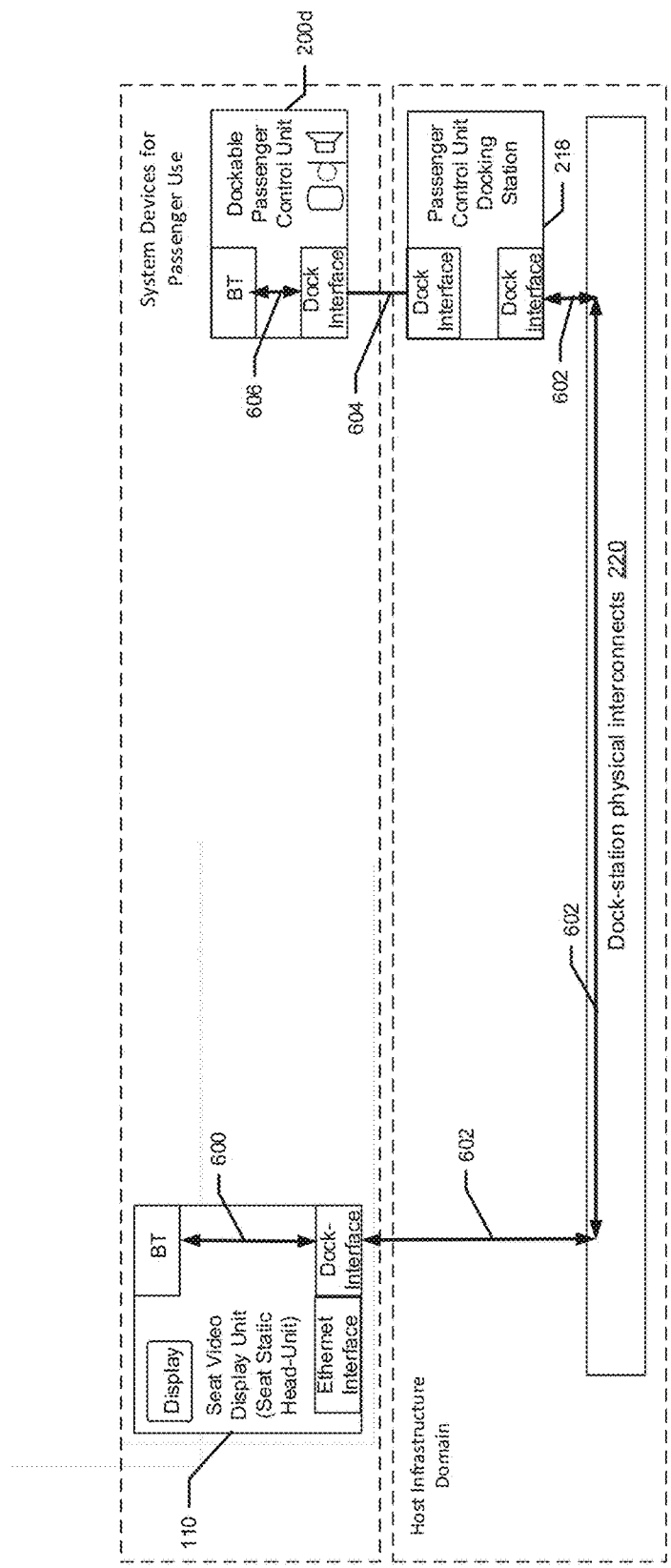
FIG. 6 is a combined block diagram and data flow diagram illustrating establishment of a connection between Bluetooth transceivers in a display unit and a wireless controller of FIG. 1-3 in accordance with some embodiments of the present disclosure.

FIG. 6 is a combined block diagram and data flow diagram illustrating establishment of a connection between Bluetooth transceivers in a SVDU 110 and a wireless controller 200 of FIG. 1-3 in accordance with some embodiments of the present disclosure. Referring to FIG. 6, connection establishment related messages between Bluetooth transceivers in the SVDU 110 and the wireless controller 200 (e.g., dockable passenger control unit 200d) are communicated through the wired dock-station physical interconnects 220 via a communication pathway segments 600, 602, 604, 606 through respective dock interfaces of the SVDU 110 and the wireless controller 200, the docking station 218, and the dock-station physical interconnects 220. Once the Bluetooth wireless connection is established, further Bluetooth messages relating to maintaining Bluetooth connection are communicated through the Bluetooth transceivers and the Bluetooth wireless connection there between and, therefore, can be performed while the wireless controller 200 is undocked. Moreover, passenger commands that are input through the wireless controller 200 and/or data that is output by the SVDU 110 are communicated through the Bluetooth transceivers and the Bluetooth wireless connection there between.

Figure 7:
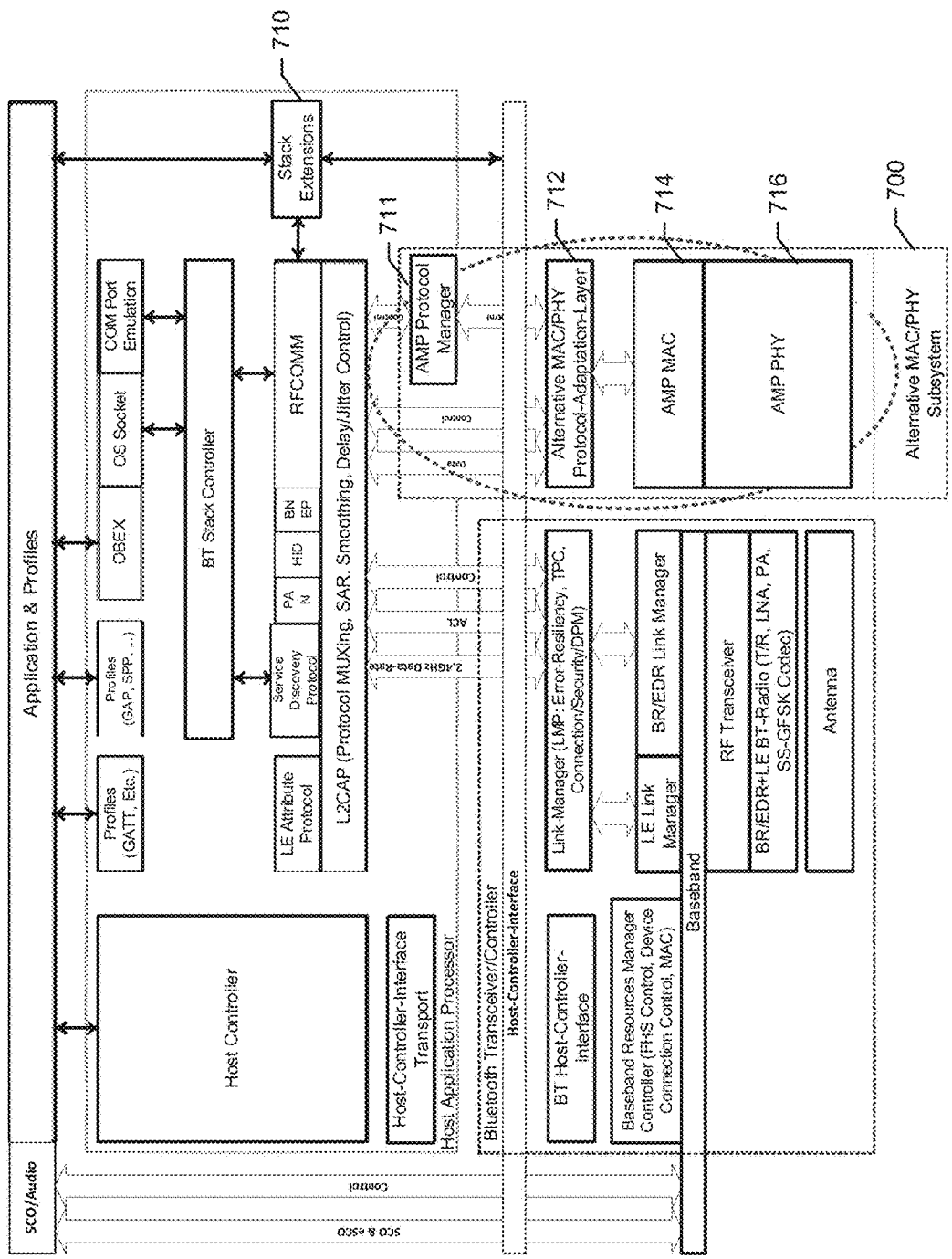
FIG. 7 is a combined block diagram and data flow diagram illustrating elements of the Bluetooth transceivers in a display unit and a wireless controller of FIG. 1-3 in accordance with some embodiments of the present disclosure.

FIG. 7 is a combined block diagram and data flow diagram illustrating elements of the Bluetooth transceivers in a display unit 110 and a wireless controller 200 of FIG. 1-3 in accordance with some embodiments of the present disclosure. The elements of a Bluetooth transceiver that are modified to perform the connection establishment and reestablishment through wired connections instead of the Bluetooth transceiver transmissions, include the application and profiles layer, the stack extension layer 710, and the alternative media access control (MAC)/Physical (PHY) subsystem 700 including the AMP protocol manager 711 and the alternative media access control (MAC)/Physical (PHY) protocol-adaptation layer 712. The AMP MAC 714 and AMP PHY 716 of the subsystem 700 may be configured as conventional Bluetooth elements. As will be explained in further detail below, the stack extensions 710, the AMP protocol manager 711, and the alternative MAC/PHY protocol-adaptation layer 712 are configured to perform functionality of a Bluetooth encapsulation module that intercepts Bluetooth messages sent from a Bluetooth module to the Bluetooth transceiver, that determines whether the Bluetooth messages relate to establishing a Bluetooth connection, that encapsulates a Bluetooth message determined to relate to establishing a Bluetooth connection into a transport message communicated to another Bluetooth transceiver of a remote device through the dock-station physical interconnects 220, and that passes-through to the Bluetooth transceiver for transmission through a Bluetooth antenna a Bluetooth message determined to be not related to establishing a Bluetooth connection.

Figure 8:
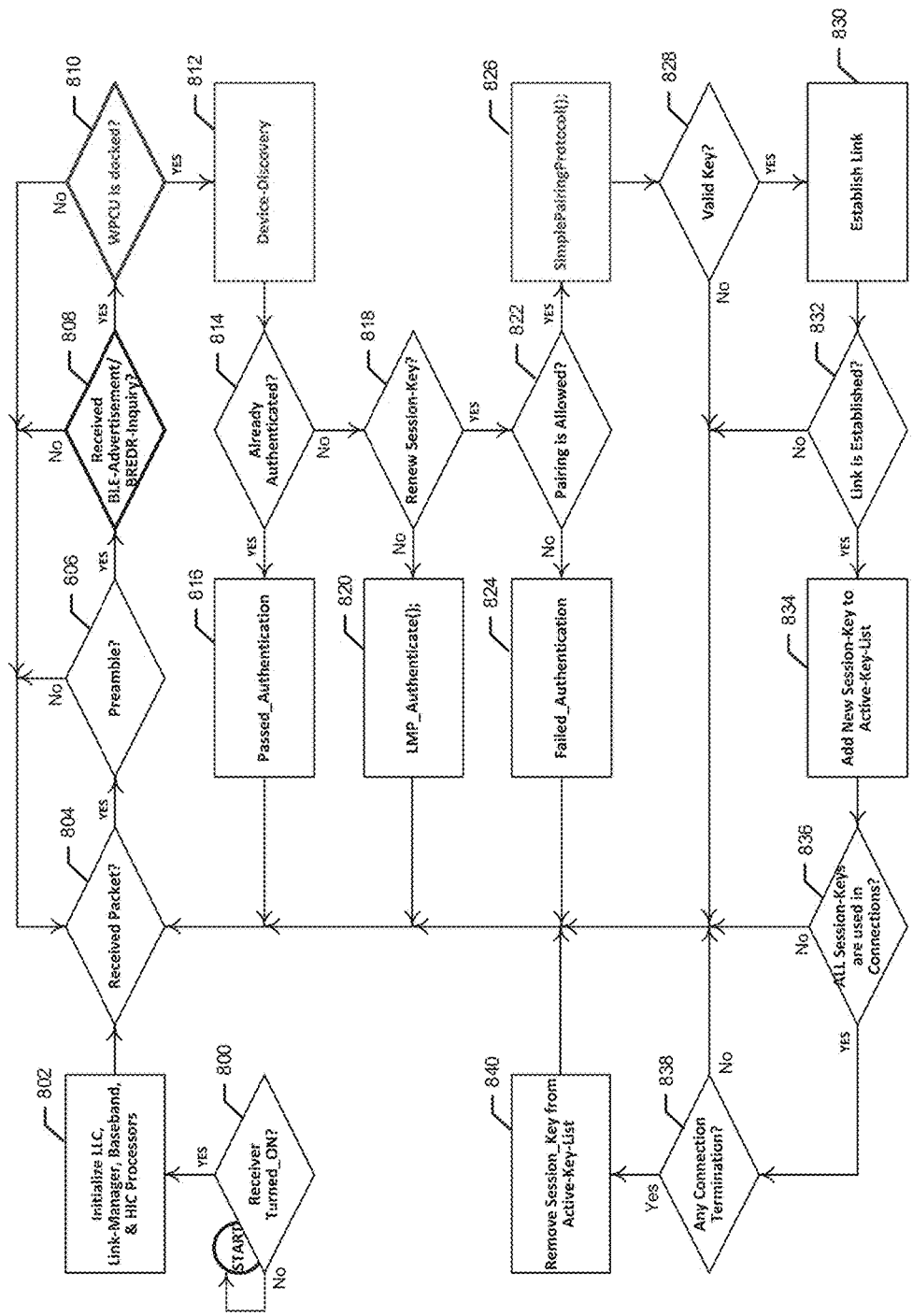
FIG. 8 is a flowchart of operations by the Bluetooth transceivers in a display unit and a wireless controller of FIG. 1-3 in accordance with some embodiments of the present disclosure.

FIG. 8 is a flowchart of operations by the Bluetooth transceivers in a display unit 110 and a wireless controller 200 of FIG. 1-3 in accordance with some embodiments of the present disclosure. Referring to FIG. 8, the operations include determining (800) whether the receiver Bluetooth equipped device is turned-on, and if so initializing (802) the logical link control layer (LLC), the link-manager, the baseband processing circuitry, and the HIC processors. Responsive to receipt (804) of a packet, the operations determine (806) whether the received packet contains a valid preamble for the Bluetooth transceiver and, if so, the operations further determine (808) whether the received packet contains a Bluetooth low energy (BLE) advertisement or a Bluetooth basic rate/enhanced data rate (BREDR)-inquiry. If so, the operations determine (810) whether the wireless controller 200 (WPCU) is docked in the docking station 218. When docked, the operations perform (812) device discovery and determine (814) whether the wireless terminal has already been authenticated and, if so, perform operations (816) according to the wireless controller 200 having passed authentication.

In contrast, when the wireless controller 200 is determined (814) to not have been already authenticated, operations determine (818) whether a new session key needs to be generated and if not, operations (820) are performed according to the wireless controller 200 not needing a new session key. In contrast, when the determination (818) is that a new session key is needed, a further determination (822) is performed whether pairing is allowed for the wireless controller 200 and, if not, failed authentication operations (824) are performed. In contrast, when pairing is allowed, simple pairing protocol operations 826 are perform via the dock-station physical interconnects 220 with a Bluetooth transceiver and the SVDU 110 that is connected to the dock station 218 in which the wireless controller 200 is docked.

A determination (828) is made whether there is a valid key and, if so, operations (830) are performed to establish a communication link. If a link is determined (832) to be established, operations (834) are performed to add a new session key to the active-key-list, and then determine (836) whether all session keys are used in active communication connections. When the determination (836) is that all session keys are used, a further determination (838) is made whether any connection has been terminated and, if so, the session key for the terminated connection is removed (840) from the active-key-list.

Figure 9A:
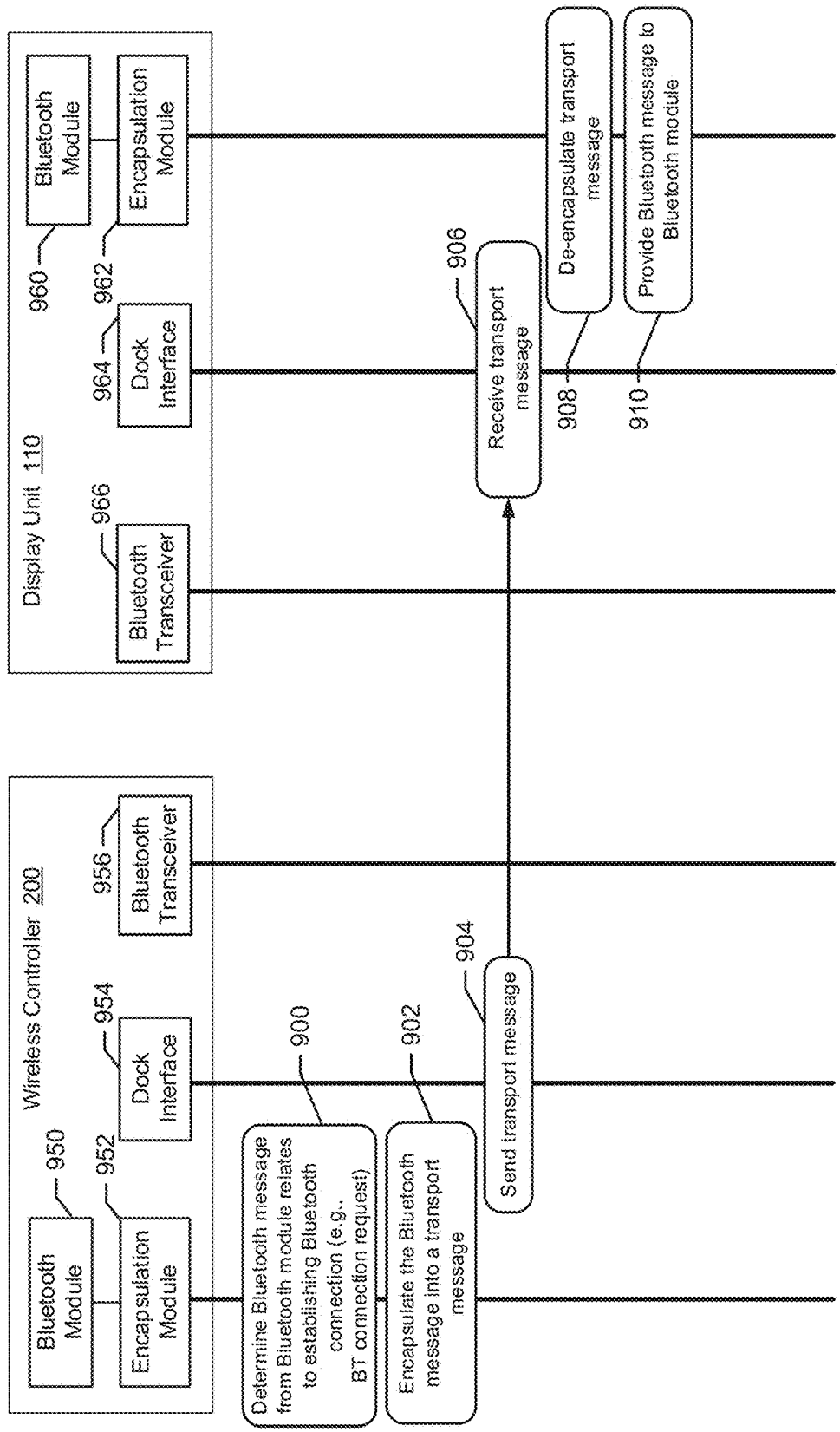
FIGS. 9A-9B are combined flowcharts and data flow diagrams illustrating establishment of a connection between Bluetooth transceivers in a display unit and a wireless controller of FIG. 1-3 in accordance with some embodiments of the present disclosure.
Figure 9B:
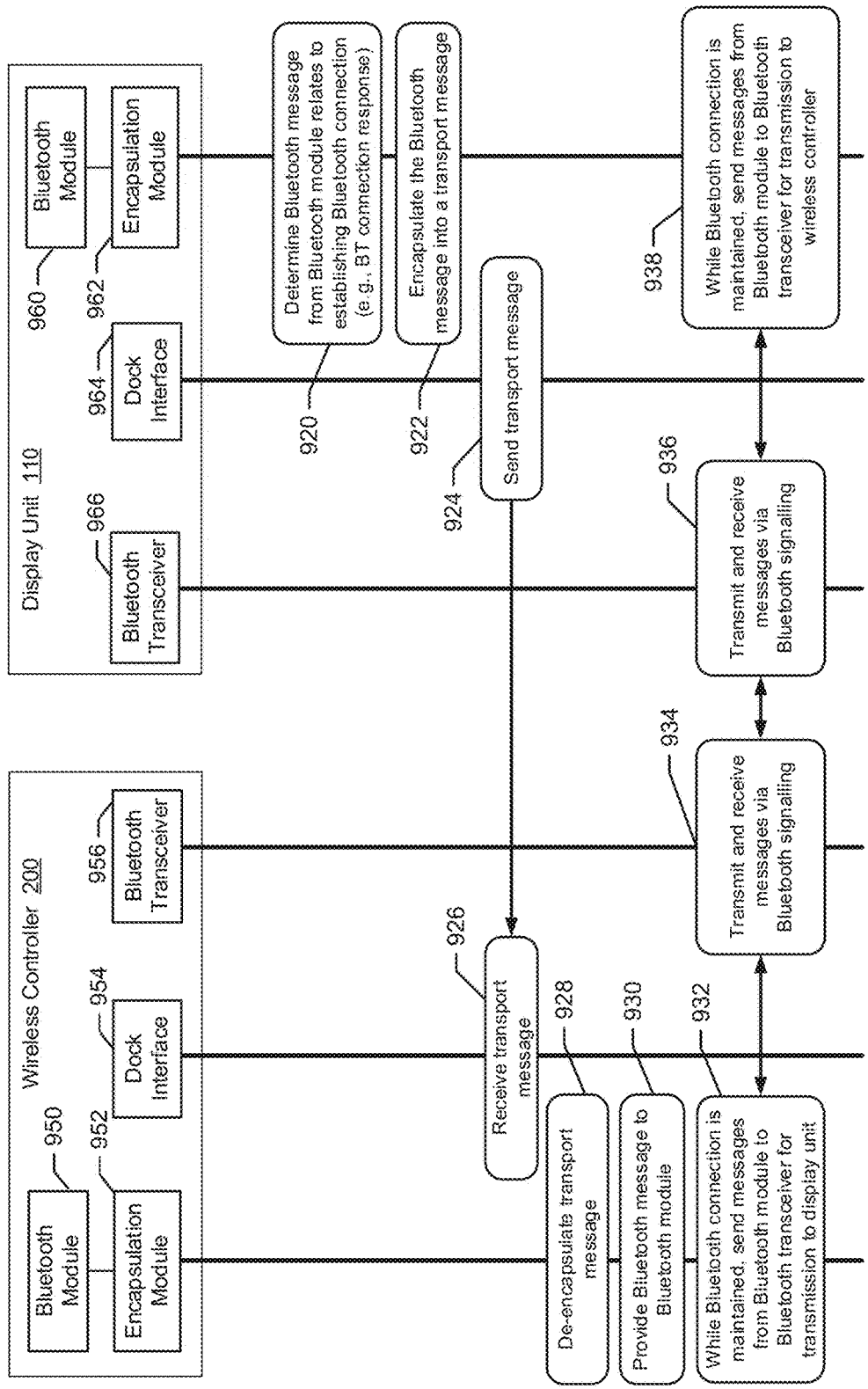

FIGS. 9A-9B are combined flowcharts and data flow diagrams illustrating establishment of a connection between Bluetooth transceivers in a display unit 110 and a wireless controller 200 of FIG. 1-3 in accordance with some embodiments of the present disclosure. Referring to FIGS. 9A-9B, while the wireless controller 200 is docked in the docking station the processor of the wireless controller 200 and the processor of the display unit 110 are configured to communicate through the wired dock interfaces 954, 964 of the wireless controller and the docking station to establish a Bluetooth connection between the Bluetooth transceivers 956, 966 of the wireless controller 200 and the display unit 110. The processor of the wireless controller does not operate to establish the Bluetooth connection using communications through the Bluetooth transceiver 956 of the wireless controller 200.

The processor of the wireless controller 200 executes a Bluetooth encapsulation module 952 that intercepts Bluetooth messages sent from a Bluetooth module 950 to the Bluetooth transceiver 956 of the wireless controller 200, and determines (900) whether the Bluetooth messages relate to establishing a Bluetooth connection. Responsive to determining that a Bluetooth message relates to establishing a Bluetooth connection, the encapsulation module 952 encapsulates (902) the Bluetooth message into a transport message that is sent (904) through the dock interface 954, the dock-station physical interconnects 220, and the dock interface 964 to the processor of the display unit 110. In contrast, the encapsulation module 952 passes-through to the Bluetooth transceiver 956 of the wireless controller 200 for transmission a, any Bluetooth message determined (900) to be not related to establishing a Bluetooth connection.

In one embodiment, the Bluetooth module 950 is configured to generate a connection message containing a Bluetooth connection request. The Bluetooth encapsulation module 952 is configured to respond to the Bluetooth connection request by encapsulating the connection message containing the Bluetooth connection request in the transport message which is communicated to the processor of the display unit 110 via the wired interfaces of the wireless controller 200 and the docking station 218.

The processor of the wireless controller 200 executing the Bluetooth encapsulation module 952 operates to respond to a Bluetooth connection becoming established between the Bluetooth transceivers 956, 966 of the wireless controller 200 and the display unit 110, by communicating further Bluetooth messages related to maintaining the Bluetooth connection through the Bluetooth transceiver 956 of the wireless controller 200 addressed to the Bluetooth transceiver 966 of the display unit 110.

The processor of the display unit 110 can be similarly configured to execute a Bluetooth encapsulation module 962 that receives (906) the transport message containing the connection message through the dock interface 964. The Bluetooth encapsulation module 962 de-encapsulates (908) the transport message to separate the connection message, and provides (910) the connection message containing the Bluetooth connection request to a Bluetooth module 960 of the display unit 110.

The processor of the display unit 110 executing the Bluetooth encapsulation module 962 can be configured to intercept Bluetooth messages sent from the Bluetooth module 960 of the display unit 110 to the Bluetooth transceiver 966 of the display unit 110, and determine (920) whether the Bluetooth messages relate to establishing a Bluetooth connection. The Bluetooth encapsulation module 962 encapsulates (922) a Bluetooth message determined to relate to establishing a Bluetooth connection into a transport message that is sent (924) to the processor of the wireless controller 200 through the wired dock interfaces 964, 954, 220. In contrast, the Bluetooth encapsulation module 962 passes-through to the Bluetooth transceiver 966 of the display unit 110 for transmission, any Bluetooth message determined to be not related to establishing a Bluetooth connection.

In one embodiment, the processor of the display unit 110 executing the Bluetooth encapsulation module 962 responds to a Bluetooth connection response output by the Bluetooth module 960, responding to the Bluetooth connection request, by encapsulating (922) the Bluetooth connection response into a transport message that is sent (924) to the processor of the wireless controller 200 through the wired dock interfaces 964, 954, 220.

The transport message is received (926) through the dock interface 954 of the wireless controller 200. The encapsulation module 952 de-encapsulates (928) the transport message to separate out the Bluetooth message from the Bluetooth module 960, and provides (930) the Bluetooth message to the Bluetooth module 950.

While the Bluetooth connection is maintained between the Bluetooth transceivers 956, 966, further messages are sent and received (932, 938) by transmission and reception operations (934, 936) through the Bluetooth transceivers 956, 966 using Bluetooth radio frequency (RF) signaling in the shared frequency band.

The processor of the wireless controller 200 can be further configured to execute the Bluetooth encapsulation module 952 to respond to loss of the Bluetooth connection between the Bluetooth transceivers 956, 966 of the wireless controller 200 and the display unit 110 and detecting subsequent re-docking of the wireless controller 200 in the docking station 218 causing communication connection of the processors of the display unit 110 and the wireless controller 200 via the wired dock interfaces 964, 954, 220, by encapsulating a Bluetooth command from the Bluetooth transceiver 956 of the wireless controller 200 into another transport message that is communicated to the processor of the display unit 110 via the wired dock interfaces 964, 954, 220, and to respond to the Bluetooth connection becoming re-established between the Bluetooth transceivers 956, 966 of the wireless controller 200 and the display unit 110 by communicating further Bluetooth messages related to maintaining the Bluetooth connection through the Bluetooth transceiver 956 of the wireless controller 200 for transmission addressed to the Bluetooth transceiver 966 of the display unit 110.

The processor of the wireless controller 200 can be configured to encapsulate Media Access Control (MAC) commands related to establishing the Bluetooth connection into transport messages communicated to the processor of the display unit 110 via the wired dock interfaces 964, 954, 220, and to respond to the Bluetooth connection becoming established by communicating further MAC commands related to maintaining the Bluetooth connection through the Bluetooth transceiver 956 of the wireless controller 200 for transmission addressed to the Bluetooth transceiver 966 of the display unit 110.

The wireless controller 200 may include a user input interface 1140 (FIG. 11) that is configured to receive commands from a user operating the wireless controller 200 to control the display unit 110. While the wired interface 954 of the wireless controller 200 remains disconnected from the wired dock interface of the docking station 218 and, thereby, disconnected from the dock interface 964 of the display unit 110, the processor of the wireless controller 200 can be configured to communicate messages containing the commands to the processor of the display unit 110 through the Bluetooth transceiver 956 of the wireless controller 200 addressed to the Bluetooth transceiver 966 of the display unit 110. In contrast, while the wired interface 954 of the wireless controller 200 remains connected to the wired interface of the docking station 218 and, thereby, connected to the dock interface 964 of the display unit 110, the processor of the wireless controller 200 can be configured to communicate through the wired dock interfaces 964, 954, 220.

In one embodiment, responsive to detecting loss of the Bluetooth connection between the Bluetooth transceivers 954, 964 of the wireless controller 200 and the display unit 110, the processor of the wireless controller 200 operates to display an indication to a user to return the wireless controller 200 to the docking station 218 to re-establish the Bluetooth connection.

Example Display Unit and Wireless Controller

Figure 10:
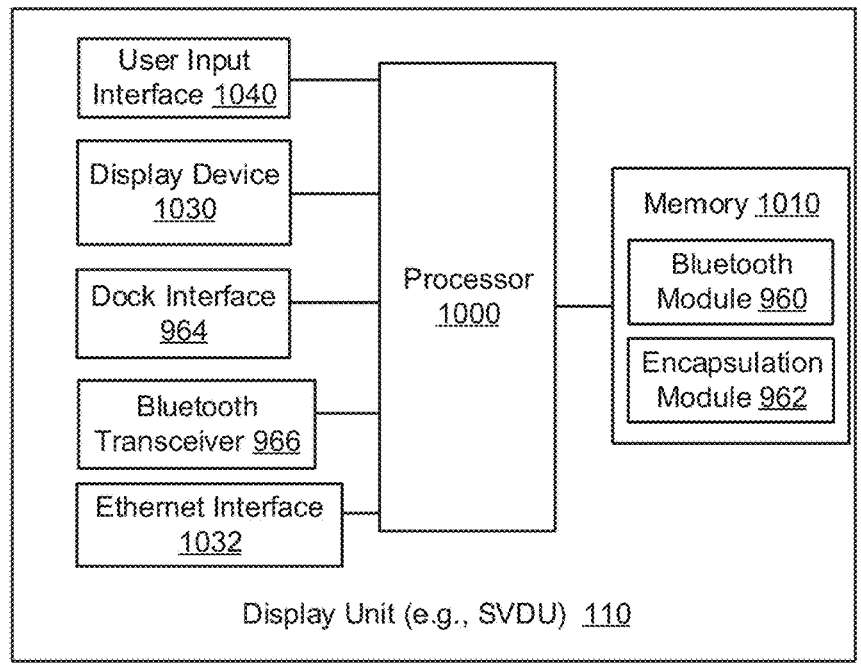
FIG. 10 is a block diagram of a display unit configured to operate in accordance with some embodiments of the present disclosure.

FIG. 10 is a block diagram of a display unit, such as the SVDU 110, that is configured to operate in accordance with some embodiments of the present disclosure. The display unit includes the dock interface 964, the Bluetooth transceiver 966, a processor 1000, and a memory 1010, and a display device 1030 (e.g., graphical display device that may include a touch sensitive display). The display unit may further include a user input interface 1040 (e.g., keypad, buttons, touch sensitive interface, etc.), and/or an ethernet interface 1032.

The processor 1000 may include one or more data processing circuits, such as a general purpose and/or special purpose processor (e.g., microprocessor and/or digital signal processor) that may be collocated or distributed across one or more networks. The processor 1000 is configured to execute computer program code in the memory 1010, described below as a non-transitory computer readable medium, to perform at least some of the operations described herein as being performed by an access control computer. The computer program code can include the Bluetooth module 960 and the encapsulation module 962. The computer program code when executed by the processor 1000 causes the processor 1000 to perform operations in accordance with one or more embodiments disclosed herein for the display units disclosed herein. The processor 1000 controls what content is played (e.g., television shows, movies), displayed (e.g., electronic books), executed (e.g., gaming programs), and/or otherwise consumed through the display unit responsive to commands received through the Bluetooth transceiver 966 from the wireless controller 200.

Figure 11:
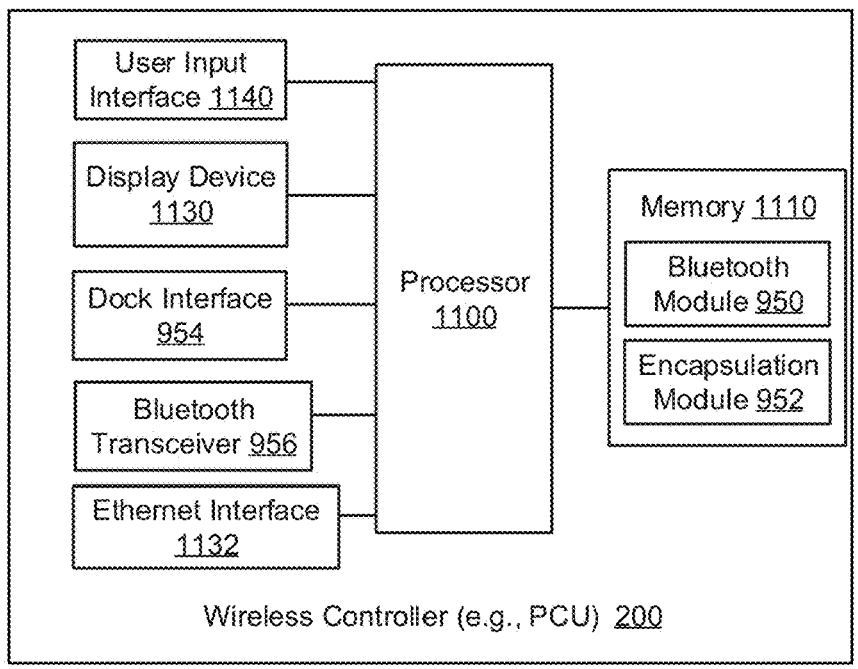
FIG. 11 is a block diagram of a wireless controller configured to operate in accordance with some embodiments of the present disclosure.

FIG. 11 is a block diagram of a wireless controller 200, such as one of the various PCUs or other wireless controllers disclosed herein, configured to operate in accordance with some embodiments of the present disclosure. The wireless controller 200 includes the dock interface 954, the Bluetooth transceiver 956, a processor 1100, and a memory 1110. The wireless controller 200 may further include a user input interface 1140 (e.g., keypad, buttons, touch sensitive interface, etc.), display device 1130 (e.g., graphical display device, LED indicators, etc.), and/or an ethernet interface 1132.

The processor 1100 may include one or more data processing circuits, such as a general purpose and/or special purpose processor (e.g., microprocessor and/or digital signal processor) that may be collocated or distributed across one or more networks. The processor 1100 is configured to execute computer program code in the memory 1110, described below as a non-transitory computer readable medium, to perform at least some of the operations described herein as being performed by an access control computer. The computer program code can include the Bluetooth module 950 and the encapsulation module 952. The computer program code when executed by the processor 1100 causes the processor 1100 to perform operations in accordance with one or more embodiments disclosed herein for the display units disclosed herein. The wireless controller 200 can be configured to be a handheld device that a user can use generate commands that are sent through the Bluetooth transceiver 956 to the display unit 110 to control consumption of content through the display device 1030, by physical manipulation, which can include rotational and/or translational movements, and/or by a user operating the user input interface 1140.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An entertainment system comprising:
a docking station comprising a wired interface;
a display unit comprising:
  a video display device; and
  a processor that is connected to communicate through a Bluetooth transceiver and through the wired interface of the docking station;
a wireless controller comprising:
  a processor connected to communicate through a wired interface; and
  a Bluetooth transceiver, the wireless controller configured to be releasably docked in the docking station to communicatively connect the wired interfaces of the wireless controller and the docking station, while docked in the docking station the processor of the wireless controller and the processor of the display unit are configured to communicate through the wired interfaces of the wireless controller and the docking station to establish a Bluetooth connection between the Bluetooth transceivers of the wireless controller and the display unit,
  wherein the processor of the wireless controller does not operate to establish the Bluetooth connection using communications through the Bluetooth transceiver of the wireless controller, and
  wherein the processor of the wireless controller executes a Bluetooth encapsulation module that causes the processor of the wireless controller to:
    intercept Bluetooth messages sent from a Bluetooth module to the Bluetooth transceiver of the wireless controller;
    determine that the Bluetooth messages relate to establishing a Bluetooth connection;
    responsive to determining that the Bluetooth messages relate to establishing the Bluetooth connection, encapsulate a Bluetooth message determined to relate to establishing a Bluetooth connection into a transport message;
    communicate the transport message to the processor of the display unit through the wired interfaces of the wireless controller and the docking station; and
    prevent the Bluetooth message determined to relate to establishing the Bluetooth connection from being transmitted via the Bluetooth transceiver.

2. The entertainment system of claim 1, wherein:
the processor of the wireless controller further executes the Bluetooth encapsulation module to, responsive to determining that additional Bluetooth messages are unrelated to establishing a Bluetooth connection, allowing the additional Bluetooth messages to pass-through to the Bluetooth transceiver of the wireless controller for transmission.

3. The entertainment system of claim 2, wherein:
the processor of the wireless controller executing the Bluetooth encapsulation module operates to respond to a Bluetooth connection becoming established between the Bluetooth transceivers of the wireless controller and the display unit by communicating further Bluetooth messages related to maintaining the Bluetooth connection through the Bluetooth transceiver of the wireless controller addressed to the Bluetooth transceiver of the display unit.

4. The entertainment system of claim 2, wherein:
the Bluetooth module is configured to generate a connection message containing a Bluetooth connection request, and the Bluetooth encapsulation module is configured to respond to the Bluetooth connection request by encapsulating the connection message containing the Bluetooth connection request in the transport message communicated to the processor of the display unit via the wired interfaces of the wireless controller and the docking station.

5. The entertainment system of claim 4, wherein:
the processor of the display unit executes a Bluetooth encapsulation module that receives the transport message containing the connection message, de-encapsulates the transport message to separate the connection message, and provides the connection message containing the Bluetooth connection request to a Bluetooth module of the display unit.

6. The entertainment system of claim 5, wherein:
the processor of the display unit further executes the Bluetooth encapsulation module to intercept Bluetooth messages sent from the Bluetooth module of the display unit to the Bluetooth transceiver of the display unit, to determine whether the Bluetooth messages relate to establishing a Bluetooth connection, to encapsulate a Bluetooth message determined to relate to establishing a Bluetooth connection into a transport message communicated to the processor of the wireless controller through the wired interfaces of the docking station and the wireless controller, and to pass-through to the Bluetooth transceiver of the display unit for transmission as a Bluetooth message determined to be not related to establishing a Bluetooth connection.

7. The entertainment system of claim 6, wherein:
the processor of the display unit executing the Bluetooth encapsulation module responds to a Bluetooth connection response output by the Bluetooth module, responding to the Bluetooth connection request, by encapsulating the Bluetooth connection response into a transport message that is communicated to the processor of the wireless controller through the wired interfaces of the docking station and the wireless controller.

8. The entertainment system of claim 2, wherein:
the processor of the wireless controller is further configured to execute the Bluetooth encapsulation module to respond to loss of the Bluetooth connection between the Bluetooth transceivers of the wireless controller and the display unit and detecting subsequent re-docking of the wireless controller in the docking station causing communication connection of the processors of the display unit and the wireless controller via the wired interfaces of the wireless controller and the docking station, by encapsulating a Bluetooth command from the Bluetooth transceiver of the wireless controller into another transport message that is communicated to the processor of the display unit via the wired interfaces of the wireless controller and the docking station, and to respond to the Bluetooth connection becoming re-established between the Bluetooth transceivers of the wireless controller and the display unit by communicating further Bluetooth messages related to maintaining the Bluetooth connection through the Bluetooth transceiver of the wireless controller for transmission addressed to the Bluetooth transceiver of the display unit.

9. The entertainment system of claim 1, wherein:
the processor of the wireless controller is configured to encapsulate Media Access Control (MAC) commands related to establishing the Bluetooth connection into transport messages communicated to the processor of the display unit via the wired interfaces of the wireless controller and the docking station, and to respond to the Bluetooth connection becoming established by communicating further MAC commands related to maintaining the Bluetooth connection through the Bluetooth transceiver of the wireless controller addressed to the Bluetooth transceiver of the display unit.

10. The entertainment system of claim 1, wherein:
the wireless controller comprises a user interface configured to receive commands from a user operating the wireless controller to control the display unit,
while the wired interface of the wireless controller remains disconnected from the wired interface of the docking station the processor of the wireless controller is configured to communicate messages containing the commands to the processor of the display unit through the Bluetooth transceiver of the wireless controller addressed to the Bluetooth transceiver of the display unit, and
while the wired interface of the wireless controller remains connected to the wired interface of the docking station the processor of the wireless controller is configured to communicate through the wired interfaces of the wireless controller and the docking station.

11. The entertainment system of claim 1, wherein:
responsive to detecting loss of the Bluetooth connection between the Bluetooth transceivers of the wireless controller and the display unit, the processor of the wireless controller operates to display an indication to a user to return the wireless controller to the docking station to re-establish the Bluetooth connection.

12. A wireless controller comprising:
a wired interface;
a Bluetooth transceiver; and
a processor connected to communicate through the wired interface and the Bluetooth transceiver, the wireless controller configured to be releasably docked in a docking station to communicatively connect the wired interface of the wireless controller to a wired interface of the docking station, while docked in the docking station the processor of the wireless controller is configured to communicate through the wired interfaces of the wireless controller and the docking station with a processor of a display unit to establish a Bluetooth connection between the Bluetooth transceiver of the wireless controller and a Bluetooth transceiver of the display unit,
wherein the processor of the wireless controller does not operate to establish the Bluetooth connection using communications through the Bluetooth transceiver of the wireless controller, and
wherein the processor of the wireless controller executes a Bluetooth encapsulation module that causes the processor of the wireless controller to:
  intercept Bluetooth messages sent from a Bluetooth module to the Bluetooth transceiver of the wireless controller;
  determine that the Bluetooth messages relate to establishing a Bluetooth connection;
  responsive to determining that the Bluetooth messages relate to establishing the Bluetooth connection, encapsulate a Bluetooth message determined to relate to establishing a Bluetooth connection into a transport message;
  communicate the transport message to the processor of the display unit through the wired interfaces of the wireless controller and the docking station; and
  prevent the Bluetooth message determined to relate to establishing the Bluetooth connection from being transmitted via the Bluetooth transceiver.

13. The wireless controller of claim 12, wherein:
the processor of the wireless controller further executes the Bluetooth encapsulation module to, responsive to determining that additional Bluetooth messages are unrelated to establishing a Bluetooth connection, allowing the additional Bluetooth messages to pass-through to the Bluetooth transceiver of the wireless controller for transmission.

14. The wireless controller of claim 13, wherein:
the processor of the wireless controller executing the Bluetooth encapsulation module operates to respond to a Bluetooth connection becoming established between the Bluetooth transceivers of the wireless controller and the display unit by communicating further Bluetooth messages related to maintaining the Bluetooth connection through the Bluetooth transceiver of the wireless controller addressed to the Bluetooth transceiver of the display unit.

15. The wireless controller of claim 13, wherein:
the Bluetooth module is configured to generate a connection message containing a Bluetooth connection request, and the Bluetooth encapsulation module is configured to respond to the Bluetooth connection request by encapsulating the connection message containing the Bluetooth connection request in the transport message communicated to the processor of the display unit via the wired interfaces of the wireless controller and the docking station.

16. The wireless controller of claim 15, wherein:
the processor of the wireless controller executing the Bluetooth encapsulation module responds to receipt, via the wired interface, of a transport message containing a Bluetooth connection response from the display unit by de-encapsulating the transport message to remove the Bluetooth connection response and to provide the Bluetooth connection response to the Bluetooth module.

17. The wireless controller of claim 13, wherein:
the processor of the wireless controller is further configured to execute the Bluetooth encapsulation module to respond to loss of the Bluetooth connection between the Bluetooth transceivers of the wireless controller and the display unit and detecting subsequent re-docking of the wireless controller in the docking station causing communication connection of the processors of the display unit and the wireless controller via the wired interfaces of the wireless controller and the docking station, by encapsulating a Bluetooth command from the Bluetooth transceiver of the wireless controller into another transport message that is communicated to the processor of the display unit via the wired interfaces of the wireless controller and the docking station, and to respond to the Bluetooth connection becoming re-established between the Bluetooth transceivers of the wireless controller and the display unit by communicating further Bluetooth messages related to maintaining the Bluetooth connection through the Bluetooth transceiver of the wireless controller for transmission addressed to the Bluetooth transceiver of the display unit.

18. A display unit comprising:
a wired interface connected to a docking station;
a Bluetooth transceiver; and
a processor connected to communicate through the Bluetooth transceiver and through the wired interface with a wireless controller that is docked in the docking station, while docked in the docking station the processor of the display unit is configured to communicate through the wired interface to the docking station with a processor of a wireless controller to establish a Bluetooth connection between the Bluetooth transceiver of the display unit and a Bluetooth transceiver of the wireless controller,
wherein the processor of the display unit does not operate to establish the Bluetooth connection with the wireless controller using communications through the Bluetooth transceiver of the display unit, and
wherein the processor of the display unit executes a Bluetooth encapsulation module that causes the processor of the display unit to:
  intercept Bluetooth messages sent from a Bluetooth module to the Bluetooth transceiver of the display unit;
  determine that the Bluetooth messages relate to establishing a Bluetooth connection;
  responsive to determining that the Bluetooth messages relate to establishing the Bluetooth connection, encapsulate a Bluetooth message determined to relate to establishing a Bluetooth connection into a transport message;
  communicate the transport message to the processor of the wireless controller through the wired interfaces connected to the docking station; and
  prevent the Bluetooth message determined to relate to establishing the Bluetooth connection from being transmitted via the Bluetooth transceiver.

19. The display unit of claim 18, wherein:
the processor of the display unit further executes the Bluetooth encapsulation module to, responsive to determining that additional Bluetooth messages are unrelated to establishing a Bluetooth connection, allowing the additional Bluetooth messages to pass-through to the Bluetooth transceiver of the display unit for transmission a Bluetooth message determined to be not related to establishing a Bluetooth connection.

20. The display unit of claim 19, wherein:
the processor of the display unit executing the Bluetooth encapsulation module responds to receipt of a transport message from the wireless controller containing a Bluetooth connection request by de-encapsulating the transport message to separate the Bluetooth connection request, and to provide the Bluetooth connection request to the Bluetooth module, and responds to receipt of a Bluetooth connection response output by the Bluetooth module by encapsulating the Bluetooth connection response into another transport message that is communicated to the processor of the wireless controller through the wired interface connected to the docking station.

\* \* \* \* \*